(12) United States Patent
Stark

(10) Patent No.: US 11,153,705 B2
(45) Date of Patent: Oct. 19, 2021

(54) METHOD AND APPARATUS FOR AN ULTRASONIC EMITTER SYSTEM FLOOR AUDIO UNIT

(71) Applicant: Voyetra Turtle Beach, Inc., White Plains, NY (US)

(72) Inventor: Juergen Stark, San Jose, CA (US)

(73) Assignee: VOYETRA TURTLE BEACH, INC., White Plains, NY (US)

( * ) Notice: Subject to any disclaimer, the term of this patent is extended or adjusted under 35 U.S.C. 154(b) by 0 days.

(21) Appl. No.: 17/001,971

(22) Filed: Aug. 25, 2020

(65) Prior Publication Data

US 2021/0084430 A1 Mar. 18, 2021

Related U.S. Application Data

(63) Continuation of application No. 16/438,053, filed on Jun. 11, 2019, now Pat. No. 10,757,526, which is a
(Continued)

(51) Int. Cl.
*H04S 7/00* (2006.01)
*H04R 5/02* (2006.01)
(Continued)

(52) U.S. Cl.
CPC ............... *H04S 7/303* (2013.01); *G06F 3/03* (2013.01); *G10K 11/352* (2013.01); *G10K 15/02* (2013.01);
(Continued)

(58) Field of Classification Search
CPC .... H04R 2217/03; H04R 5/027; H04R 1/403; H04R 5/04; H04R 2205/024; H04R 5/02; H04S 7/303
(Continued)

(56) References Cited

U.S. PATENT DOCUMENTS 5,991,693 A * 11/1999 Zalewski ............... G09B 5/065
345/156
6,229,899 B1    5/2001 Norris et al.
(Continued)

OTHER PUBLICATIONS

International Search Report and Written Opinion for PCT/US14/67136, dated Mar. 3, 2015, 11 pages.

*Primary Examiner* — Thjuan K Addy
(74) *Attorney, Agent, or Firm* — McAndrews, Held & Malloy, Ltd.

(57) ABSTRACT

Methods and systems are provided for audio devices with enhanced directional operations. An example audio device includes an orientation determination circuit configured to determine an orientation of at least a part of a user's body, a first audio output component, a second audio output component, and a controller configured to control the first audio output component and the second audio output component based on the determined orientation. The determined orientation may correspond to a positional nature of the user within a three-dimensional space around the user. The controller may be configured to provide a three-dimensional audio environment according to the user. The three-dimensional audio environment is aligned according to a visual input provided to the user.

18 Claims, 13 Drawing Sheets

Related U.S. Application Data continuation of application No. 16/026,435, filed on Jul. 3, 2018, now Pat. No. 10,321,257, which is a continuation of application No. 15/451,626, filed on Mar. 7, 2017, now Pat. No. 10,015,617, which is a continuation of application No. 14/550,688, filed on Nov. 21, 2014, now Pat. No. 9,591,426.

(60) Provisional application No. 61/907,797, filed on Nov. 22, 2013.

(51) Int. Cl.

| | |
|---|---|
| *H04R 5/04* | (2006.01) |
| *H04B 5/00* | (2006.01) |
| *H04B 3/00* | (2006.01) |
| *G10K 11/35* | (2006.01) |
| *G10K 15/02* | (2006.01) |
| *G06F 3/03* | (2006.01) |
| *H04B 11/00* | (2006.01) |
| *H04S 5/00* | (2006.01) |

(52) U.S. Cl.
CPC .............. *H04B 11/00* (2013.01); *H04R 5/02* (2013.01); *H04R 5/04* (2013.01); *H04S 5/005* (2013.01); *H04S 7/301* (2013.01); *H04R 2205/024* (2013.01); *H04R 2217/03* (2013.01); *H04S 2400/05* (2013.01)

(58) Field of Classification Search
USPC .............................. 381/303, 79, 17, 77, 310
See application file for complete search history.

(56) References Cited

U.S. PATENT DOCUMENTS

| | | |
|---|---|---|
| 2004/0247140 A1 | 12/2004 | Norris et al. |
| 2008/0095401 A1 | 4/2008 | Saleh et al. |
| 2011/0034300 A1 | 2/2011 | Hall |
| 2011/0211035 A1 | 9/2011 | Ota et al. |
| 2012/0076306 A1 | 3/2012 | Aarts et al. |
| 2012/0081504 A1 | 4/2012 | Ng et al. |
| 2012/0224456 A1 | 9/2012 | Visser et al. |
| 2012/0322542 A1 | 12/2012 | Chudd et al. |
| 2013/0064376 A1* | 3/2013 | Kaburlasos ............. H04S 7/304 381/17 |
| 2013/0322674 A1 | 12/2013 | Ren et al. |

* cited by examiner

METHOD AND APPARATUS FOR AN ULTRASONIC EMITTER SYSTEM FLOOR AUDIO UNIT

CLAIM OF PRIORITY

This patent application is a continuation of U.S. patent application Ser. No. 16/438,053, filed on Jun. 11, 2019, which is a continuation of U.S. patent application Ser. No. 16/026,435, filed on Jul. 3, 2018, which is a continuation of U.S. patent application Ser. No. 15/451,626, filed on Mar. 7, 2017, which is a continuation of U.S. patent application Ser. No. 14/550,688, filed on Nov. 21, 2014, which in turn claims priority to and benefit from the U.S. Provisional Patent Application Ser. No. 61/907,797, filed on Nov. 22, 2013. Each of the above identified patent applications is hereby incorporated herein by reference in its entirety.

INCORPORATION BY REFERENCE

This patent application makes references to:
U.S. Pat. No. 6,577,738 titled "Parametric virtual speaker and surround-sound system;"
U.S. Pat. No. 7,298,853 titled "Parametric virtual speaker and surround-sound system;" and
U.S. Pat. No. 7,596,229 titled "Parametric audio system for operation in a saturated air medium."

Each of the above identified patents is hereby incorporated herein by reference in its entirety.

TECHNICAL FIELD

Aspects of the present application relate to audio systems, particularly systems that may generate directional sound utilizing ultrasonic emitters. More specifically, various implementations in accordance with the present disclosure relate to systems and methods for ultrasonic emitter system floor audio units.

BACKGROUND

Limitations and disadvantages of conventional approaches to audio output devices, particularly those providing ultrasonic emissions, will become apparent to one of skill in the art, through comparison of such systems with some aspects of the present disclosure as set forth in the remainder of the present application with reference to the drawings.

BRIEF SUMMARY

Systems and methods are provided for ultrasonic emitter system floor audio units, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}.

In other words, "x, y and/or z" means "one or more of x, y and z." As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
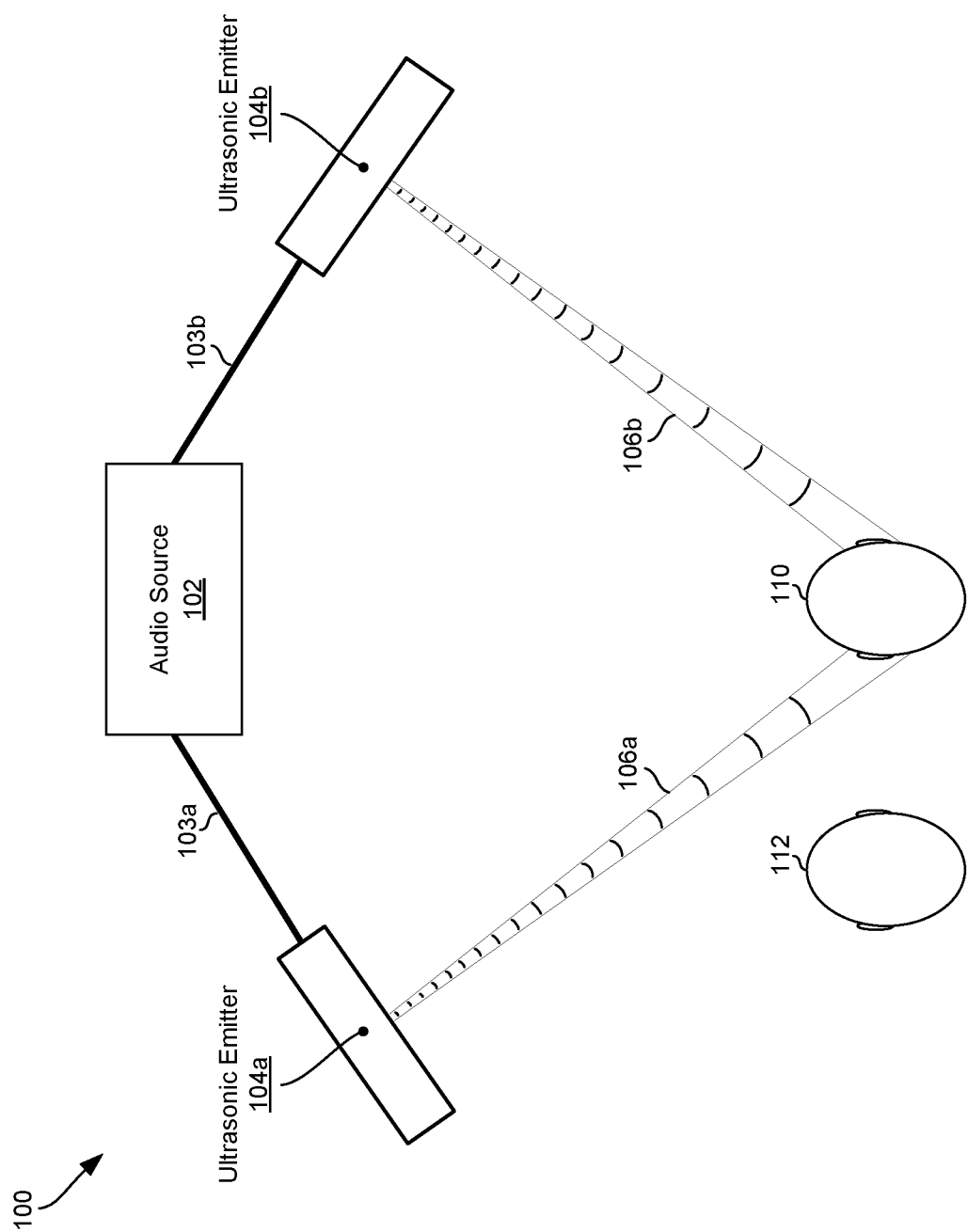
FIG. 1 illustrates an example ultrasonic system that is operable to generate ultrasonic signals, in accordance with an example embodiment of the present disclosure.

FIG. 1 illustrates an example ultrasonic system that is operable to generate ultrasonic signals, in accordance with an example embodiment of the present disclosure. Shown in FIG. 1 is an ultrasonic system 100, which may comprise an audio source 102 and pair of ultrasonic emitters 104a and 104b.

The audio source 102 may comprise suitable circuitry operable to receive, generate, and/or process audio signals for output to one or more conventional speakers and/or directional ultrasonic emitters. For example, in the implementation shown in FIG. 1, the audio source 102 may be operable to receive, generate, and/or process audio signals for output to the ultrasonic emitters 104a and 104b, which may be coupled to the audio source 102 via links 103a and 103b. For illustration, the system is assumed to be a HyperSound System (HSS) that uses ultrasonic emitters for projecting directional ultrasonic signals as described, for example, in U.S. Pat. Nos. 7,298,853, 6,577,738, and 7,596,229 (all of which are hereby incorporated herein by reference in their entirety) and also in www.parametricsound.com/technology.php. Nonetheless, aspects of the present disclosure may be used with other technology for generating directional ultrasonic signals.

The audio source 102 may be, for example, a dedicated audio receiver/processor, a multi-function set-top-box (e.g., a cable television set-top-box or Direct Broadcast Satellite set-top box), a computer (e.g., Windows, MAC, or Linux based) with sound processing and output capabilities, or the like.

Each of the links 103a and 103b may be a wired, wireless, and/or optical link. Links 103a, 103b may carry an electrical and/or optical representation of an audio-band signal.

Each of the ultrasonic emitters 104a and 104b may be operable to receive an audio-band signal from its respective one of links 103a and 103b and convert the audio-band to ultrasonic waves transmitted in a highly-focused air beam (shown as air beams 106a and 106b). Alternatively, audio source 102 may comprise suitable circuitry for providing ultrasonic modulation, and links 103a and 103b may carry an electrical and/or optical representation of an ultrasonic signal. The propagation of the ultrasonic signal in air may effectively demodulate the ultrasonic signals with respect to the listener; thus, an active demodulation device may not be required. The corresponding demodulated audio-band signal may be audible to the listener 110 that is within the airbeams, namely 106a and 106b. The corresponding demodulated audio-band signals may be greatly attenuated to the listener 112. The emitters 104a and 104b may be mounted in any desired location. For example, they may be mounted to either side of a television as conventional left and right channels speakers are typically mounted. As another example, the speakers may be mounted in an apparatus that places them close to the listeners ears (e.g., mounted to a chair that the listener sits in) to achieve sound quality similar to headphones but without having headphones actually touching the listeners head.

Aspects of this disclosure improve the ability of the system shown in FIG. 1 to create a three-dimensional sound effect whereby, although the audio-band signal is emitted from only the two emitters 104a and 104b, the listener 110 perceives various sounds in the audio as emanating from various locations in the 3D space around him/her (i.e., virtual surround sound).

In accordance with some embodiments of the disclosure, the exemplary system that is illustrated in FIG. 1 may also be operable to generate a three-dimensional sound and may comprise one or more ultrasonic emitters that comprise glass, aluminum, graphene, ferro-fluid, and/or other material, which may be operable to generate a ultrasonic output.

Figure 2:
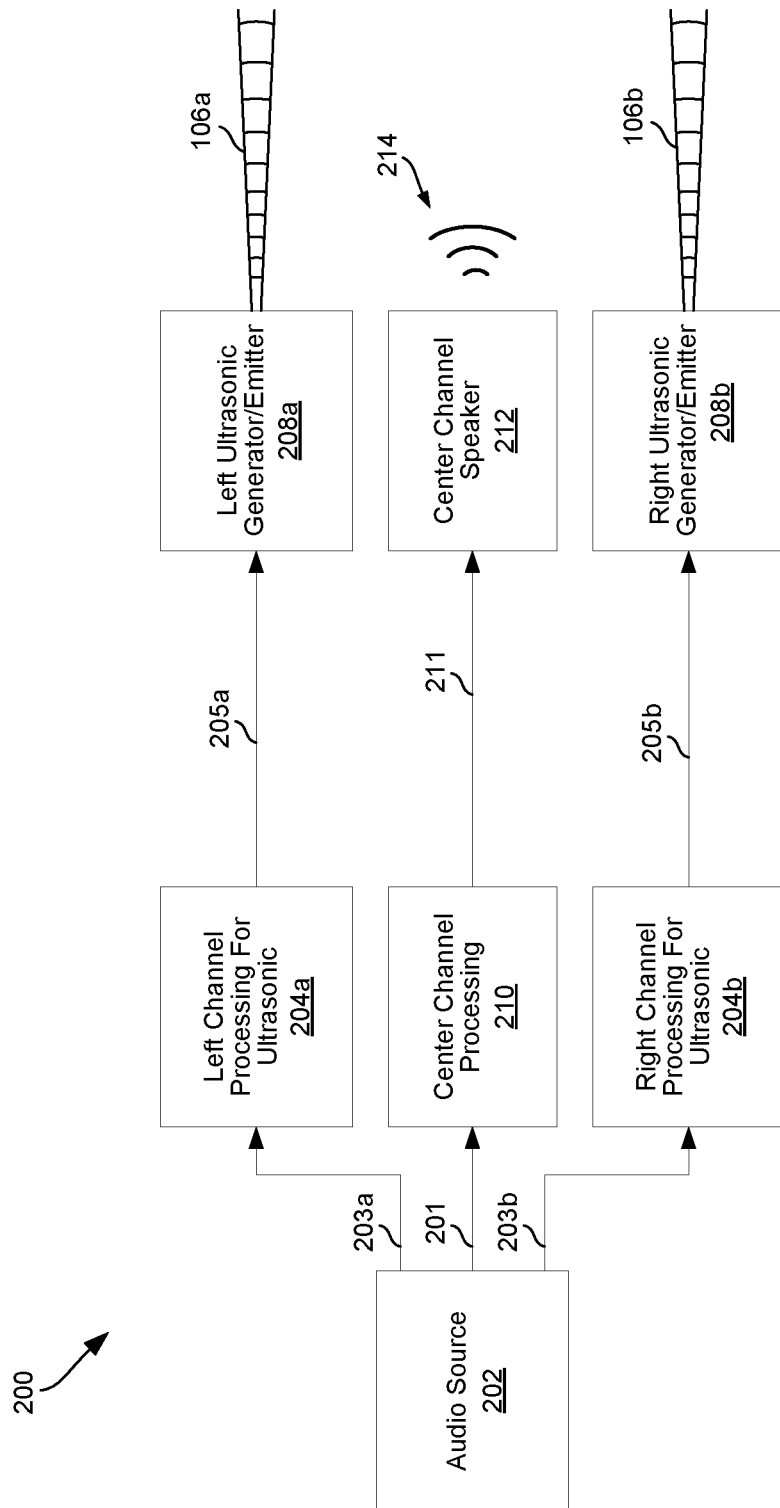
FIG. 2 illustrates an example circuit for an ultrasonic device that is operable to generate ultrasonic signals, in accordance with an example embodiment of the present disclosure.

FIG. 2 illustrates an example circuit for an ultrasonic device that is operable to generate ultrasonic signals, in accordance with an example embodiment of the present disclosure. Shown in FIG. 2 is an ultrasonic device 200.

The ultrasonic device 200 may comprise suitable circuitry for generating and/or outputting ultrasonic signals. For example, as shown in the implementation depicted in FIG. 2, the ultrasonic device 200 may comprise an audio source 202, processing circuits 204a and 204b, ultrasonic generators/emitters 208a and 208b, an audio processing circuit 210, and speaker 212.

The audio source 202 may comprise, for example, memory for storing audio files and circuitry for reading the audio files and generating electrical and/or optical audio-band signals. The audio source 202 may comprise, for example, circuitry for receiving and processing audio signals (e.g., circuitry for demodulating, decoding, etc. to recover an audio band signal from a modulated carrier) that were transmitted over a wired, wireless, or optical link. The audio source 202 may, for example, reside in the receiver 102 of FIG. 1. The audio source 202 outputs a left channel audio signal 203a and a right channel audio signal 203b, each of which may be an optical and/or electrical audio-band signal.

The processing circuits 204a and 204b may be operable to process the signal 203 (e.g., perform frequency-dependent amplitude, frequency, and/or phase adjustment) to generate signals 205a and 205b. As compared to driving the ultrasonic emitters (either directly, or via circuits 206a and 206b) with the signals 203a and 203b, the signals 205a and 205b may result in a three-dimensional sound effect that the user perceives as more realistic/natural. In this regard, a problem that arises with the ultrasonic emitters is that the power of the sound in the ultrasonic sound column does not diminish as a function of distance in the same way that sound normally does in free space (the path loss of an audio signal in free space is $(4*\pi*d/\lambda)^2$ where d is the distance from transmitter to receiver and $\lambda$ is the wavelength of the signal). Consequently, the sound may be perceived as unnatural to the listener. Accordingly, the circuits 204a and 204b may be configured to apply a transfer function that may mimic the free space propagation loss that the ultrasonic signals would experience if propagating in free space—as is the manner in which the listener is used to hearing such sounds. To apply such processing, the circuits 204a and 204b may first determine the distance from the emitters 208a and 208b to the listener. This distance may be determined in any suitable way. In an example implementation, the distance may be determined by infrared, laser, or other distance measuring sensors integrated into the emitters 208a and 208b and/or a receiver, a set-top box, etc. that houses the circuits 202, 204, and 210. In an example implementation, the distance may be input by a user or installer of the system (e.g., via a graphical user interface). Alternatively, the transfer function may represent the frequency response of the emitter.

The ultrasonic generators/emitters 208a and 208b are operable to receive the electrical and/or optical audio band signal 207a and 207b and convert them to ultrasonic beams, as described above with respect to FIG. 1, for example. Each of the ultrasonic generators/emitters 208a and 208b may comprise a glass, aluminum, ferro-fluid, graphene and/or other type of emitter, which is operable to generate ultrasonic signals. Alternatively, circuitry 204a and 204b may comprise ultrasonic modulation and links 205a and 205b may carry an electrical and/or optical representation of an ultrasonic signal.

The system of FIG. 2 also comprises a conventional speaker 212, for use as center channel speaker, which outputs sound wave 214 corresponding to center channel audio. For example, the center channel audio frequencies may be below 250-300 Hz. The sound wave 214 experiences free space path loss as non-directional audio waves conventionally do.

The different propagation characteristics of the ultrasonic beams 106 and the sound wave 214, there may cause an unnatural phase and/or time delay between the left and right channel audio arriving via emitters 208 and the center channel audio arriving via speaker 212. Accordingly, the circuitry 210, 204a, and 204b may be operable to process the left, right, and center channel audio such that the center channel arrives at the proper time and/or phase relative to the left and right channels, as would be the case if all three channels were transmitted via conventional speakers.

Figure 3:
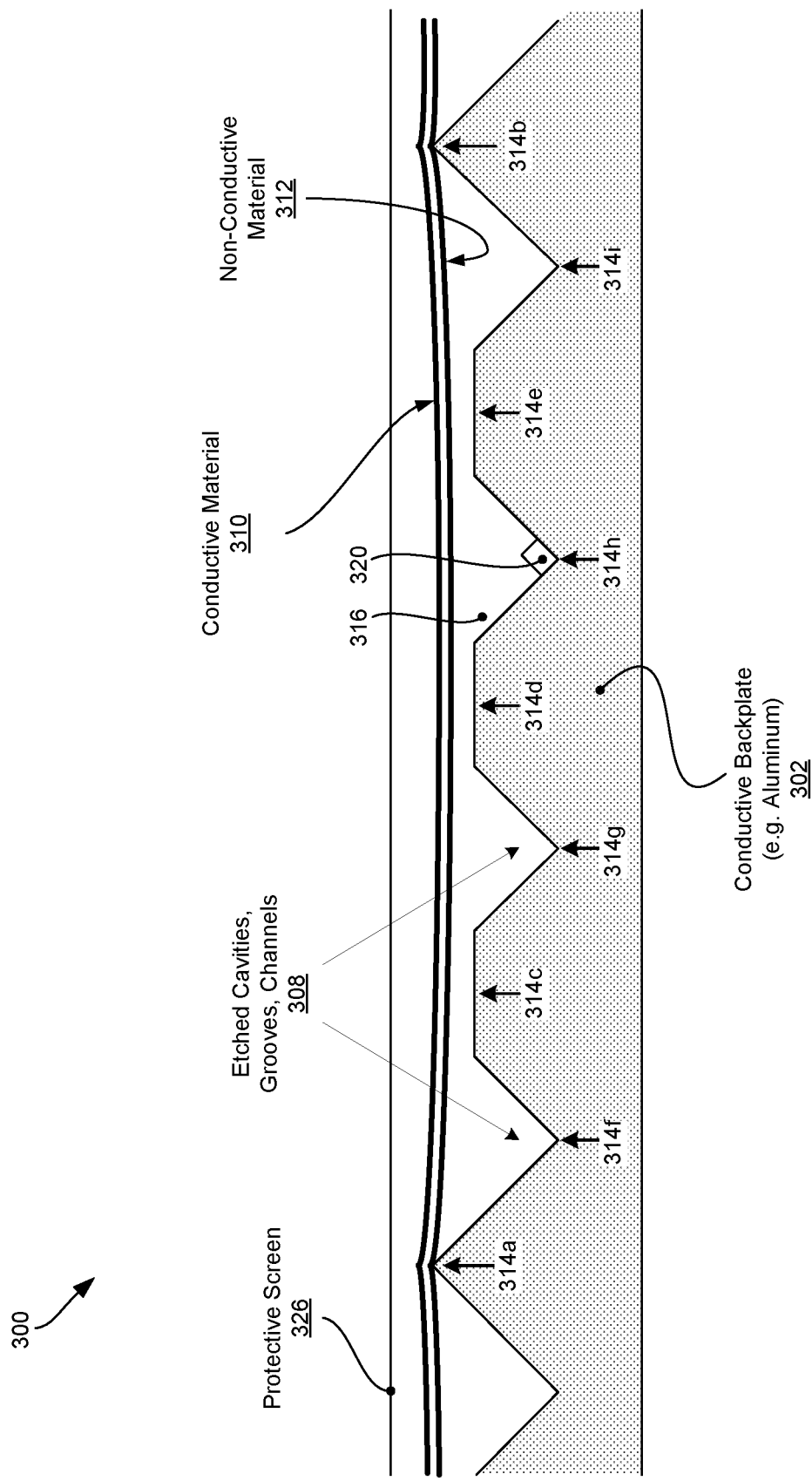
FIG. 3 illustrates an example system that utilizes an ultrasonic emitter comprising a film with a conductive layer to generate ultrasonic signals in an electrostatic arrangement, in accordance with an example embodiment of the present disclosure.

FIG. 3 illustrates an example system that utilizes an ultrasonic emitter comprising a film with a conductive layer to generate ultrasonic signals in an electrostatic arrangement, in accordance with an example embodiment of the present disclosure. Shown in FIG. 3 is an ultrasonic emitter 300 which may utilize a film to generate ultrasonic signals.

The ultrasonic emitter 300 may comprise a conductive backplate 302, a faceplate, and a protective screen 326. The reference numerals 314a-314i are utilized to define the perimeter of the chamber 316. The ultrasonic emitter 300 described herein may also be referred to as an electrostatic transducer. U.S. Pat. Nos. 4,246,449 and 4,081,626 disclose example electrostatic transducers.

The backplate 302 may comprise suitably rigid material that may be operable to provide a stable support for the emitter structure 300. The backplate 302 may comprise an electrically conductive material. In this regard, the backplate 302 may be coupled to a first electrical lead that may be utilized to bias the ultrasonic emitter 300. In accordance with an embodiment of the disclosure, the backplate 302 may comprise an aluminum backplate.

The backplate 302 may comprise a plurality of cavities 308. The cavities 308 may also be referred to as grooves or channels. Notwithstanding, the cavities 308 may be etched or otherwise placed within a front surface of the backplate 302. The peaks 314a and 314b resulting from cavities 308 may be utilized to support the faceplate. The enclosed structure formed by the peaks 314a, 314b, the ridges 314c, 314d, 314e, the bottom of the cavities 314f, 314g, 314h, 314i and the non-conducting material 312 comprises a chamber 316.

The faceplate may comprise a film with a conductive layer or diaphragm that resonates to generate the ultrasonic signal from the ultrasonic emitter 300. The film or diaphragm may comprise, for example, a Mylar or Kapton electrostatic film, Polypropylene film, Polyvinylidene Fluoride (PVDF) film and/or other film or diaphragm suitable for generating ultrasonic signals. In various example embodiments of the disclosure, the faceplate comprising the film or diaphragm may comprise an outer conductive material 310 and a non-conductive material 312. In the example ultrasonic emitter 300, the resonating faceplate 310 comprising the film may be operable to function as a diaphragm that is displaced in order to propagate the corresponding ultrasonic waves. The faceplate comprising the film diaphragm may be coupled to a second electrical lead (via the conductive material 310) that may be utilized to bias the ultrasonic emitter 300.

The non-conductive material 312 may isolate the conductive material 310 from the conductive backplate 302. In this regard, the non-conductive material 312 may prevent an electrical short from occurring between the faceplate 310 comprising the film and the backplate 302.

Although, the conductive material 310 and the non-conductive material 312 are illustrated separately, the disclosure is not limited in this way. The conductive material 310 and the non-conductive material 312 together may form an inseparable thin film. The geometry and dimension of the ultrasonic emitter 300 and the volume of the chamber 316 may comprise example factors that may affect performance of the emitter. For example, the greater the volume of the chamber 316, the lower the resonant frequency. The number of ridges within the chamber 316 may also affect performance of the emitter. Although three ridges, namely, 314c, 314d, 314e are shown between the peaks 314a, 314b, the disclosure is not limited in this regard. Accordingly, there may be less than 3 ridges or greater than 3 ridges between the peaks 314a, 314b. In some embodiments of the disclosure, there may be 3-5 ridges between the peaks 314a, 314b. Additionally, the angle 320 may be 90 degrees to provide optimal reflection of sonic or ultrasonic waves. An angle of approximately 90 degrees and an optimal number of ridges between the peaks 314a, 314b may cause an increase in the resonant frequency of the ultrasonic emitter 300, which in turn causes an increase in the ultrasonic output of the emitter.

The protective screen 326 may comprise a suitable material that may protect the ultrasonic emitter 300 or, for example, in particular, the faceplate 310 from damage. The material that is utilized for the protective screen 326 may be selected so that it may enhance the ultrasonic output. In an example embodiment of the disclosure, the protective screen 326 may comprise a plastic screen. In this regard, the plastic screen may, for example, function as an impedance matching element that increases the ultrasonic output. In an example embodiment of the disclosure, the plastic screen may double the ultrasonic output power. The protective screen 326 may be cosmetic and may also be necessary for standards approval such as Underwriters Laboratory (UL) approval.

Figure 4:
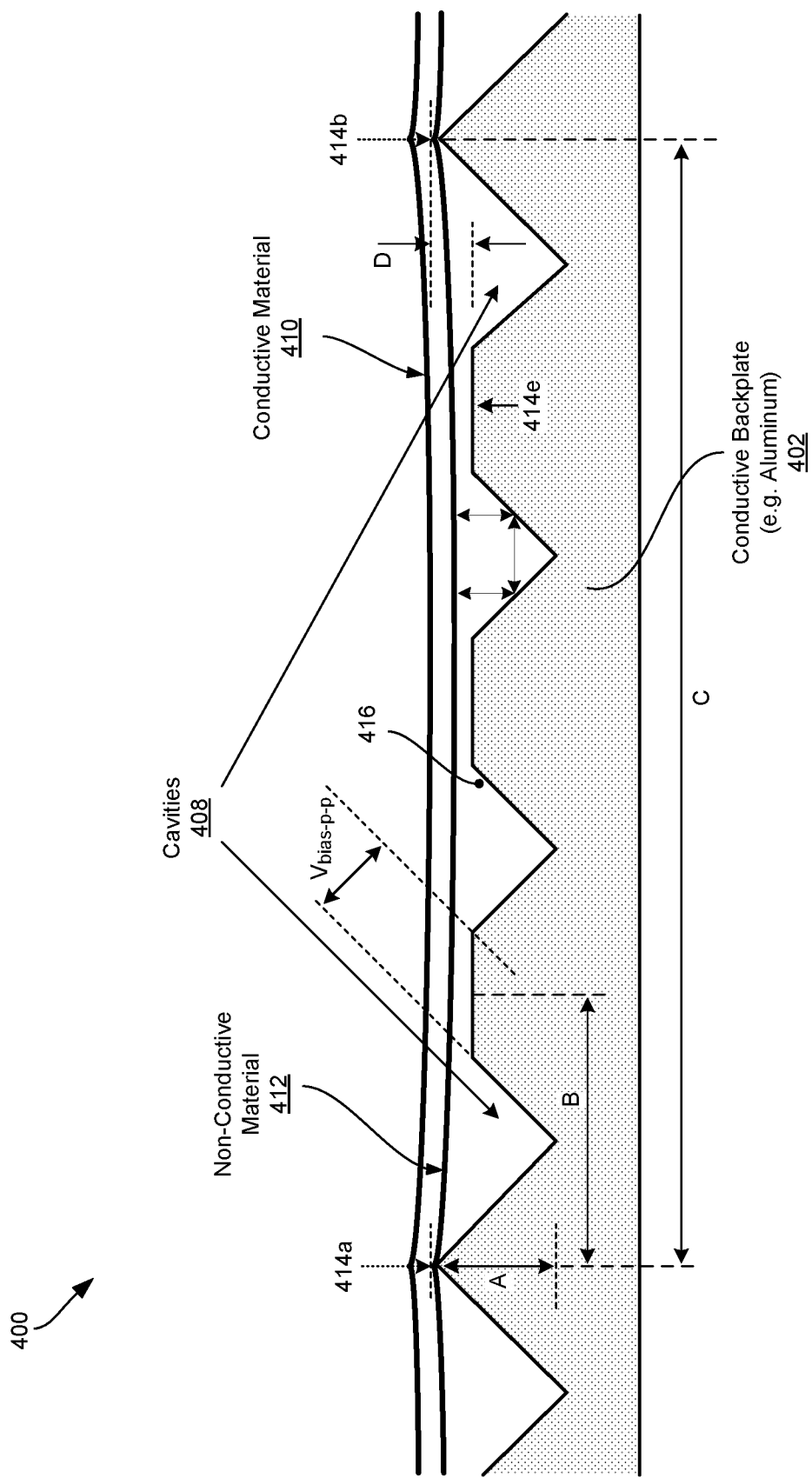
FIG. 4 illustrates an example configuration of an ultrasonic emitter comprising a film with a conductive layer to generate ultrasonic signals in an electrostatic arrangement, in accordance with an example embodiment of the present disclosure.

FIG. 4 illustrates an example configuration of an ultrasonic emitter comprising a film with a conductive layer to generate ultrasonic signals in an electrostatic arrangement, in accordance with an example embodiment of the present disclosure. Shown in FIG. 4 is an ultrasonic emitter 400 that utilizes a film with a conductive layer to generate ultrasonic signals.

The ultrasonic emitter 400 may be substantially similar to the ultrasonic emitter 300, which is shown and described with respect to, for example, FIG. 3. The ultrasonic emitter 400 may comprise, for example, a conductive backplate 402, and a faceplate. The ultrasonic emitter 400 may also comprise a plurality of ridges such as a ridge 414e, a chamber 416, and a plurality of cavities 408 on the backplate 402. The structure of the ultrasonic emitter 400 may be substantially similar to the structure of the emitter 300, which is shown and described with respect to, for example, FIG. 3. Accordingly, the backplate 402, the peaks 414a, 414b, the ridge 414e, the faceplate, the chamber 416, and the plurality of cavities 408 may be similar to the corresponding components, namely, the backplate 302, the peaks 314a, 314b, the ridge 314e, the faceplate, the chamber 316, and the plurality of cavities 308, respectively, which are shown and described with respect to, for example, FIG. 3.

The faceplate may comprise a film with a conductive layer or diaphragm that resonates to generate the ultrasonic signal from the ultrasonic emitter 400. In various example embodiments of the disclosure, the faceplate comprising the film or diaphragm may comprise a conductive material 410 and a non-conductive material 412.

In various implementations, the design and/or construction of the ultrasonic emitter 400 may be adjusted based on performance criteria or parameters. In this regard, in general, the greater the surface area of the faceplate, which comprises the film, the greater the output may be for the same amount of power. Additionally, the greater the volume of the faceplate or film for the ultrasonic emitter 400 and/or the greater the volume of the chamber 416 for the ultrasonic emitter 400, the lower the resonant frequency.

Various example dimensions are illustrated in FIG. 4, which may be utilized by the ultrasonic emitter 400. In this regard, the thin design of the ultrasonic emitter 400 provides greater flexibility.

For example, the dimension D may represent the difference between the height of the peak 414b and the height of the ridge 414e. In an example embodiment of the disclosure, dimension D may be approximately 13 microns or about 0.0005 inch. The ultrasonic emitter 400 may be designed such that when the faceplate and the non-conductive material 412 resonates, which are supported by the peaks 414a, 414b, the faceplate and the non-conductive material 412 does not touch the ridges such as the ridge 414e, which are within the chamber 416.

The dimension C may represent the distance between the supports or peaks 414a and 414b. In an example embodiment of the disclosure, the dimension C may be approximately 0.12 inch.

The dimensions A, B, and C may be selected so that they are a functionality of the wavelength, λ. In accordance with some embodiments of the disclosure, the dimensions A, B, C may be chosen so as to achieve a resonant frequency that is approximately equivalent to the natural resonant frequency of the film that is utilized for the faceplate, which comprises a film or diaphragm.

The thickness of the faceplate, which comprises a film or diaphragm, may be related to the wavelength of the carrier frequency, fc. The thickness of the faceplate comprising the film or diaphragm may be selected so that it provides suitable headroom for the bias voltage. For example, a thickness with ½ mil (0.0005 inch) may provide better headroom voltage comparing to a thickness with ¼ mil.

The number of ridges between the peaks 414a, 414b, which support the faceplate, may affect the resonant frequency of the ultrasonic emitter 400. In accordance with various embodiments of the disclosure, an optimal number of ridges between the peaks 414a, 414b increases the resonant frequency of the ultrasonic emitter 400. The resultant increase in the resonant frequency of the ultrasonic emitter 400 causes an increase in the ultrasonic output of the emitter.

Figure 5A:
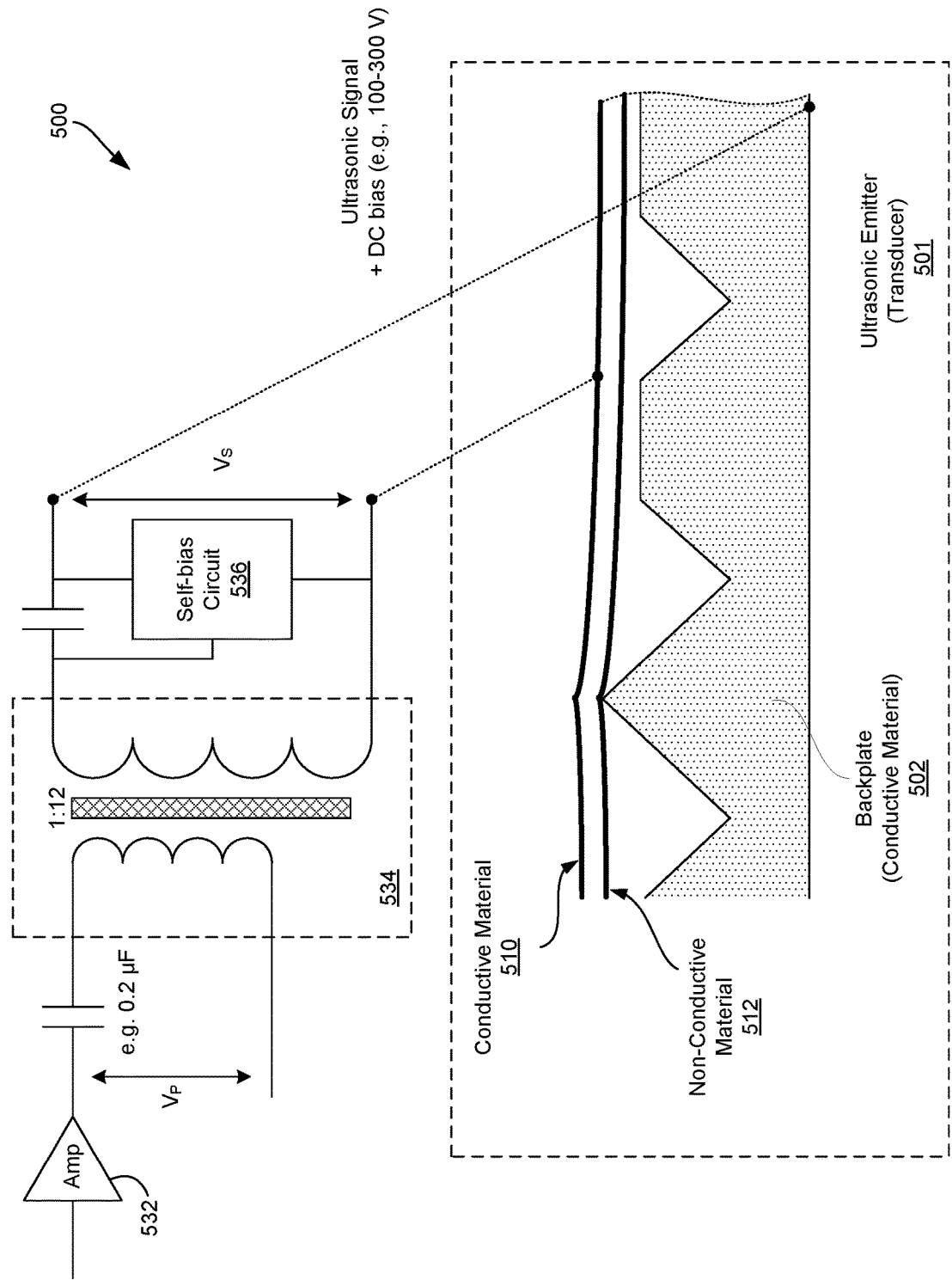
FIG. 5A illustrates an example transformer coupled to an ultrasonic emitter that utilizes a film with a conductive layer with a conductive layer, in accordance with an example embodiment of the present disclosure.

FIG. 5A illustrates an example transformer coupled to an ultrasonic emitter that utilizes a film with a conductive layer with a conductive layer, in accordance with an example embodiment of the present disclosure. Shown in FIG. 5A is circuitry 500 and an example ultrasonic emitter 501.

The circuitry 500 comprises an amplifier 532, a transformer 534, and a self-bias circuit 536. The ultrasonic emitter 501 may comprise a conductive backplate 502 and a faceplate. The faceplate may comprise, for example, a conductive material 510 and a non-conductive material 512.

Although, the conductive material 510 and non-conductive material 512 are illustrated as separate elements, the disclosure is not limited in this way. For example, the conductive material 510 and the non-conductive material 512, such that, for example, the conductive material 510 and the non-conductive material 512 together comprise an inseparable thin film.

The ultrasonic emitter (transducer) 501 may be substantially similar to the ultrasonic emitter 300, which is shown and described with respect to, for example, FIG. 3. Accordingly, the backplate 502 and the faceplate may be similar to the corresponding components, namely, the backplate 302 and the faceplate, respectively, which are shown and described with respect to, for example, FIG. 3.

The amplifier 532 may comprise, for example, a class D switching amplifier. In an example embodiment of the disclosure, the amplifier 532 and/or the transformer 534 may, for example, reside in the audio receiver/processor 102 of FIG. 1, or reside in the processing circuit 204a or 204b of FIG. 2.

The transformer 534 may comprise primary and secondary windings. The primary windings of the transformer 534 may be electrically coupled to the amplifier 532. The secondary windings of the transformer 534 may be electrically coupled to the self-bias circuit 536. The self-bias circuit 536 may in turn be coupled to the ultrasonic emitter 501. In this regard, the transformer 534 may receive an input signal $V_P$ from the amplifier 532 via the primary windings of the transformer 534. The input signal $V_P$ may be coupled with a DC bias produced by, for example, the self-bias circuit 536, such that, for example, and an output signal $V_s$ from the secondary winding of the transformer 534 may comprise an ultrasonic signal combined with a biasing voltage of, for example, approximately 100-300 volts DC. A first output of the self-bias circuit 536 may be electrically coupled to the conductive material 510 of the ultrasonic emitter 501, and a second output of the self-bias circuit 536 may be electrically coupled to the backplate 502 of the ultrasonic emitter 501. In such instances, the output signal $V_s$ may be applied between the conductive material 510 and the backplate 502.

Figure 5B:
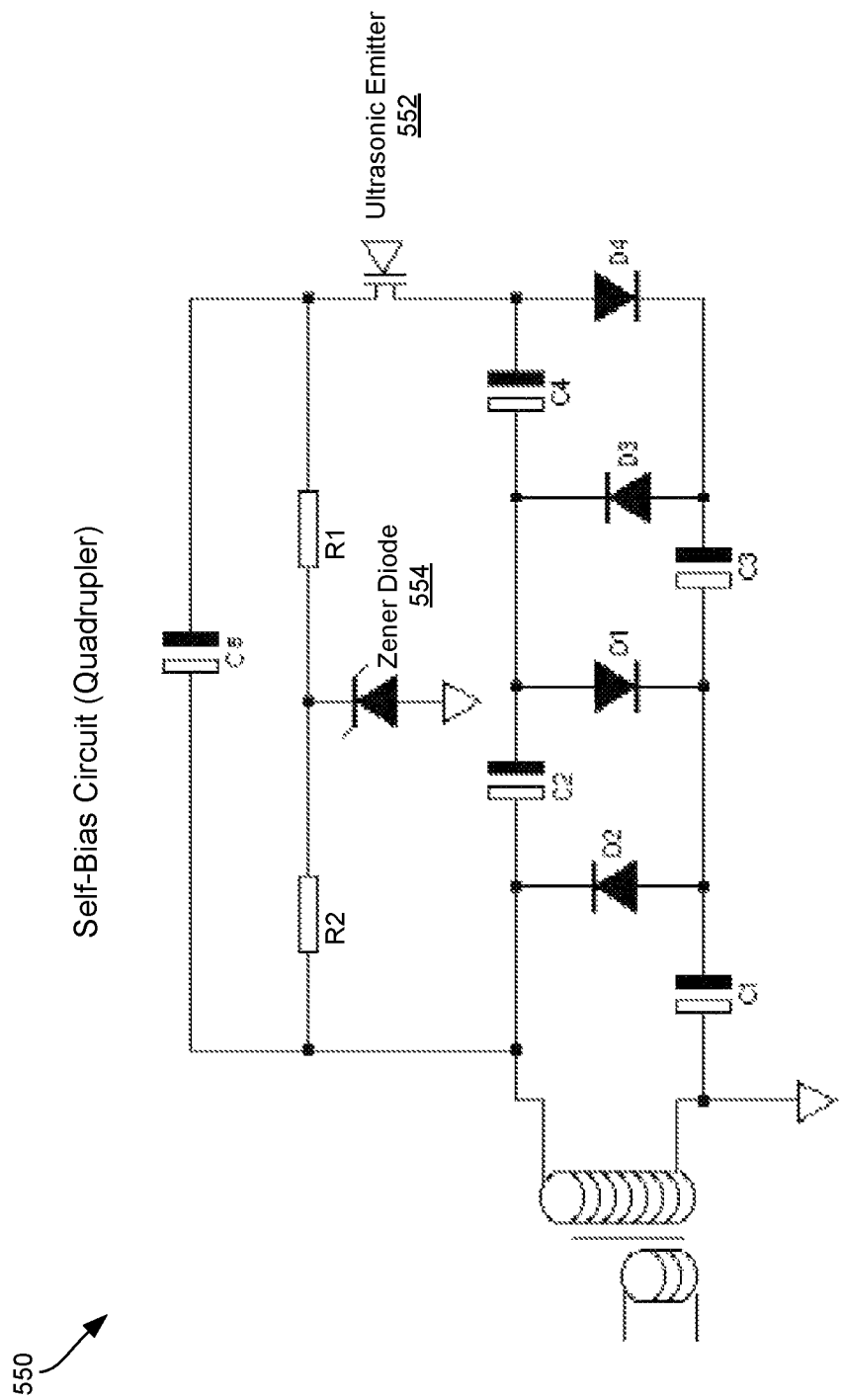
FIG. 5B illustrates an example self-bias circuit for use in ultrasonic emitters, in accordance with various example embodiments of the present disclosure.

FIG. 5B illustrates an example self-bias circuit for use in ultrasonic emitters, in accordance with various example embodiments of the present disclosure. Shown in FIG. 5B is an example self-bias circuit 550. The self-bias circuit 550 is an example embodiment of the self-bias circuit 536, which is shown and described with respect to FIG. 5A.

A first output of the self-bias circuit 536 may be electrically coupled to the conductive material 510 (FIG. 5A) of the ultrasonic emitter 501, and a second output of the self-bias circuit 536 may be electrically coupled to the backplate 502 (FIG. 5A) of the ultrasonic emitter 501 (FIG. 5A). In such instances, the output signal $V_s$ may be applied between the conductive material 510 (FIG. 5A) and the backplate 502 (FIG. 5A).

Figure 6A:
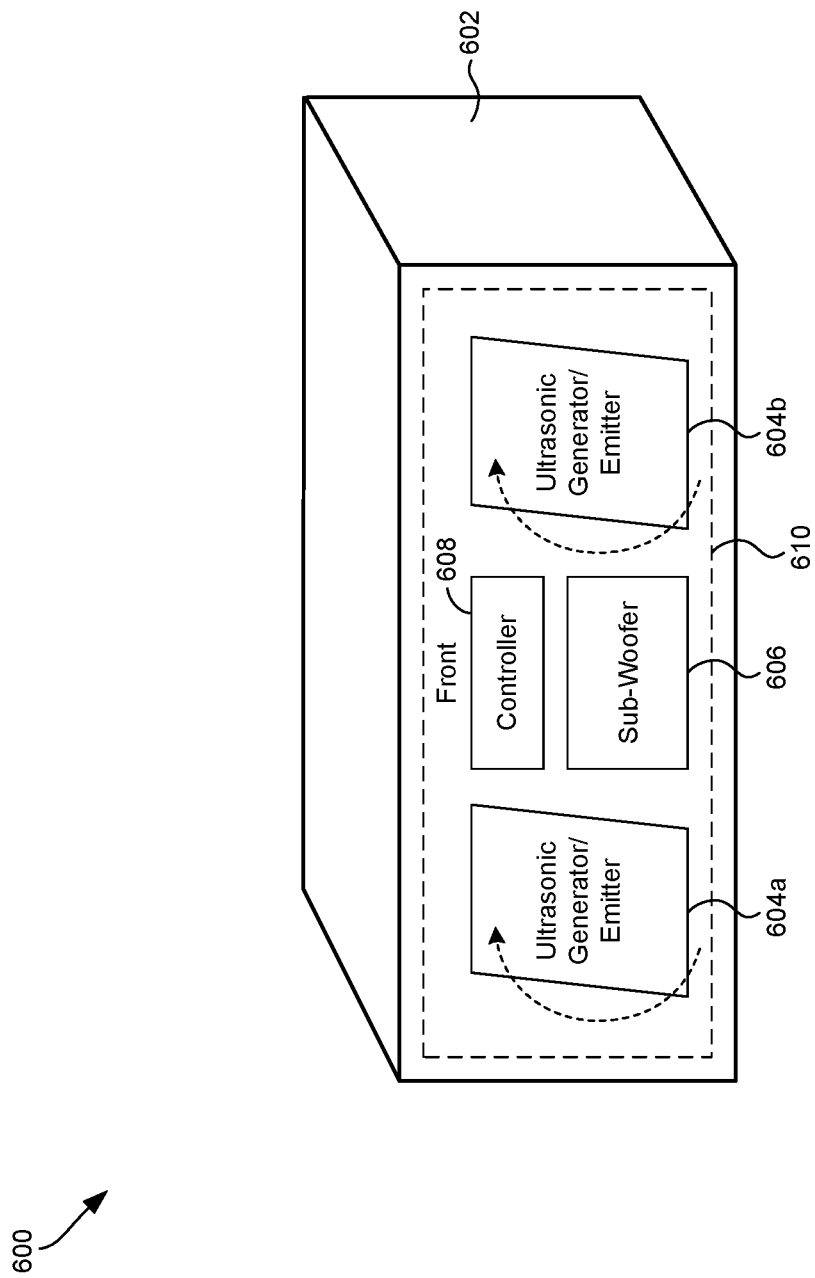
FIG. 6A illustrates an example ultrasonic emitter system floor audio unit, in accordance with an example embodiment of the present disclosure.

FIG. 6A illustrates an example ultrasonic emitter system floor audio unit, in accordance with an example implementation of the present disclosure. Shown in FIG. 6A is an ultrasonic emitter system floor audio unit 600.

The ultrasonic emitter system floor audio unit 600 may comprise an enclosure 602, a pair of ultrasonic generators/emitters 604a and 604b, a sub-woofer 606, a controller 608, and a protective material or component 610. The enclosure 602 may function as a housing that encases and protects the components of the ultrasonic emitter system floor audio unit 600. The enclosure 602 may comprise a rigid material such as a plastic, metal and/or a composite material. The dimensions of the enclosure 602 may be kept at a minimum so as to enable the ultrasonic emitter system floor audio unit 600 to be utilized in many applications, especially applications in which space may be a premium. For example, the height of the enclosure 602 may be minimized so that the enclosure 602 has a very low profile. The enclosure 602 may be placed on a floor or near to a floor, for example, in or proximate to a booth or a kiosk (or otherwise be integrated into a booth or kiosk at or near the floor). Further, the ultrasonic emitter system floor audio unit 600 (and various components thereof) may be configurable to account for such placement, such as to ensure that output signals are projected based on that placement and/or positioning of listeners' relative to the ultrasonic emitter system floor audio unit 600.

The enclosure 602 may comprise a mounting mechanism (not shown) for the ultrasonic generators/emitters 604a and 604b, which enables the ultrasonic generators/emitters 604a and 604b to be angled or tilted in one or more planes so that ultrasonic beams may be directed towards a head of a listener. The dotted arrows illustrates an example plane in which the ultrasonic generators/emitters 604a and 604b may be angled or tilted to project output (e.g., ultrasonic beams or hypersound audio) from the floor up towards a head of a listener.

The ultrasonic generators/emitters 604a and 604b may be operable to receive electrical and/or optical audio band signals and convert them to ultrasonic beams, as described above. For example, the ultrasonic generators/emitters 604a and 604b may be substantially similar to the ultrasonic generators/emitters 208a and 208b, which are illustrated in and described above with respect to FIG. 2, for example. Each of the ultrasonic generators/emitters 604a and 604b may comprise a glass, aluminum, ferro-fluid, graphene and/or other type of emitter, which is operable to generate ultrasonic signals.

In an example implementation, the ultrasonic generators/emitters 604a and 604b may be affixed to motorized mounts within the enclosure 602. These motorized mounts may be used, for example, in order to adjust the angle of the ultrasonic generators/emitters 604a and 604b so that they may optimally direct and project the audio (e.g., 3D hypersound audio) towards the ear of the listener.

The sub-woofer 606 may be operable to receive audio band signals from the controller 608 and convert them to low frequency sub-woofer audio. The sub-woofer 606 may be encased in the enclosure of the ultrasonic emitter system floor audio unit 600.

The controller 608 may comprise suitable circuitry for enabling the ultrasonic emitter system floor audio unit 600 to receive power, and electrically and/or optically received audio band signals and convert them to ultrasonic beams. The controller 608 may also comprise an amplifier that may be utilized to amplify the received audio band signals and generate corresponding audio signals from the sub-woofer 606. The controller 608 may also be operable to control other functions and/or operations in (or of) the ultrasonic emitter system floor audio unit 600. For example, the controller 608 may be operable to control movement of the mounting mechanism for the ultrasonic generators/emitters 604a and 604b, which enables the ultrasonic generators/emitters 604a and 604b to be angled or tilted. In this regard, the controller 608 may tilt or angle the ultrasonic generators/emitters 604a and 604b so that ultrasonic beams may be directed upwards from the floor towards a head of a listener that is standing in front of the ultrasonic emitter system floor audio unit 600. Alternatively, the controller may apply or modify beamforming to steer output of the ultrasonic generators/emitters 604a and 604b so that ultrasonic beams may be directed upwards from the floor towards a head of listener that is standing in front of the ultrasonic emitter system floor audio unit 600.

The protective material or component 610 may comprise suitable material that may be operable to protect at least the ultrasonic generators/emitters 604a and 604b and at the same time enable the corresponding ultrasonic signals to be emitted from the ultrasonic generators/emitters 604a and 604b. In an example implementation, the protective material or component 610 may comprise a protective cloth or sheath. In another example implementation, the protective material or component 610 may comprise a protective grill that is placed in front of the ultrasonic generators/emitters 604a and 604b, and optionally, in front of the sub-woofer 606. In some implementations, the protective grill may be placed so that it covers the entire front of the enclosure 602 facing the ultrasonic generators/emitters 604a and 604b.

In various example implementations, the ultrasonic emitter system floor audio unit 600 may be located on or near to a floor (e.g., at a residence, in or proximate to a retail display or booth, kiosk, etc.). The ultrasonic generators/emitters 604a and 604b in emitter system floor audio unit 600 may be adjusted or tilted so that they project hypersound (ultrasonic beams) upwards to create a sweet spot or optimal position of 3D audio a few feet out towards a listener that may be standing in front of the ultrasonic emitter system floor audio unit 600. In other words, the ultrasonic emitter system floor audio unit 600 may be operable to project ultrasonic beams upwards from the ground in order to create a 3D audio environment for a listener standing in the right position in front of the ultrasonic emitter system floor audio unit 600. In doing so, the ultrasonic emitter system floor audio unit 600 and/or various components thereof may be controlled or adjusted to account for the placement of the enclosure 602 on or near the floor and/or the positioning of the listeners' (e.g., generally being upward from the enclosure 602, and/or the particular positioning of each listener).

In an example implementation, floor audio units (e.g., the floor audio unit 600) may be designed and/or constructed such that they may be integrated directly into floor (rather than being built as stand-alone devices or components). Alternatively, the floor audio units may be designed and/or constructed such that they may be integrated into flat or very then objects (e.g., floor mats) so that they may be laid (as part of the objects into which they are integrated) on the floor thus allowing users to walk or step over them. To enable such implementations, speakers (particularly the ultrasonic generators/emitters) may be designed and/or built to be thin as to allow integration into the floors and/or into thin objects laid on the floors, while still providing any required directional emissions (e.g., off the vertical, as they likely would be positioned flat on the floors) by other suitable means or techniques.

Figure 6B:
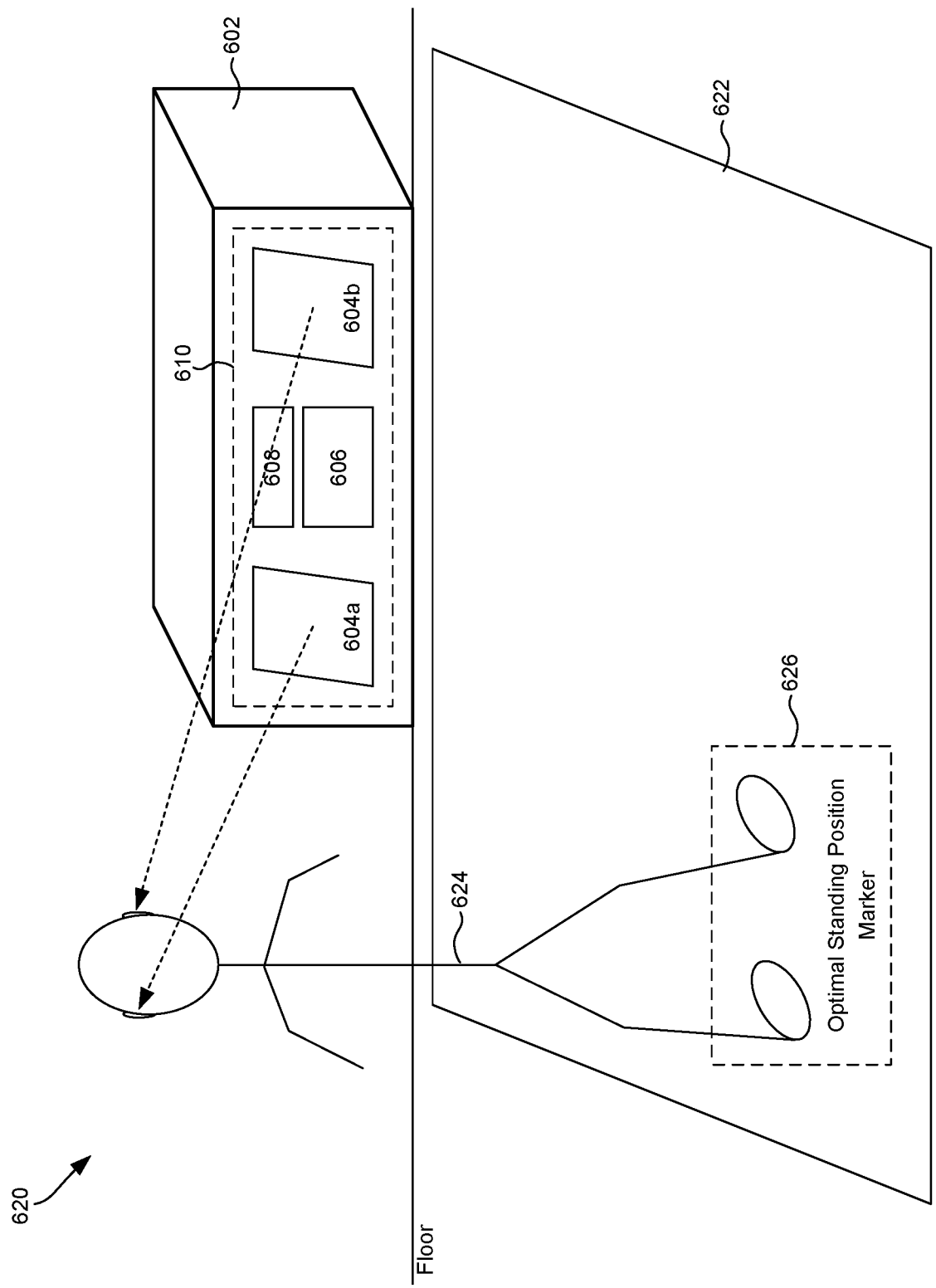
FIG. 6B illustrates an example use scenario of a listener standing at the optimal standing position in front an ultrasonic emitter system floor audio unit that projects sound upwards, in accordance with an example embodiment of the present disclosure.

FIG. 6B illustrates an example use scenario of a listener standing at the optimal standing position in front an ultrasonic emitter system floor audio unit that projects sound upwards, in accordance with an example implementation of the present disclosure. Shown in FIG. 6B is a particular space 620, in which the ultrasonic emitter system floor audio unit 600 (as described in FIG. 6A) may be placed, particularly on the floor or near it. Also shown in FIG. 6B are a floor mat 622 and a listener 624. The floor mat 622 comprises an optimal standing position marker 626.

The ultrasonic emitter system floor audio unit 600 comprises the enclosure 602, the ultrasonic generators/emitters 604a and 604b, the sub-woofer 606, the controller 608, and the protective material or component 610. The enclosure 602, the ultrasonic generators/emitters 604a and 604b, the sub-woofer 606, the controller 608, and the protective material or component 610 are described with respect to FIG. 6A, for example.

The floor mat 622 may be placed or painted on the floor and comprises the optimal standing position marker 626. The optimal standing position marker 626 comprises a visible marking that functions as a visual aid that may be utilized by the listener 624 to align themselves with the ultrasonic generators/emitters 604a and 604b for optimal reception of the 3D hypersound audio that is projected upwards from floor. The listener 624 may stand within the region defined by the optimal standing position marker 626 in order to optimally listen to the upwardly projecting 3D hypersound audio that is generated from the ultrasonic generators/emitters 604a and 604b.

Although a single marker is illustrated, the disclosure is not limited in this regard. Accordingly, a plurality of markers may be utilized. For example, two markers may be utilized, and the listener 624 may stand with each foot on one of the markers.

In the example use scenario shown in FIG. 6B, the optimal positioning may be pre-determined, thus allowing determining the optimal standing position marker 626. Nonetheless, in other implementations, rather than simply pre-determining a particular optimal standing positioning, the positioning of the would-be listener may be determined, and the generation and/or outputting functions (or related components) may be adjusted to account for that positioning such as to ensure optimal experience at the determined position. Further, in some implementations, ultrasonic emitter system floor audio units in accordance with the present disclosure may be configured to concurrently optimize listening experience of multiple listeners, such as by determining positioning of each listener, and generating output beams that are particularly adjusted and/or optimized for each listener.

Figure 6C:
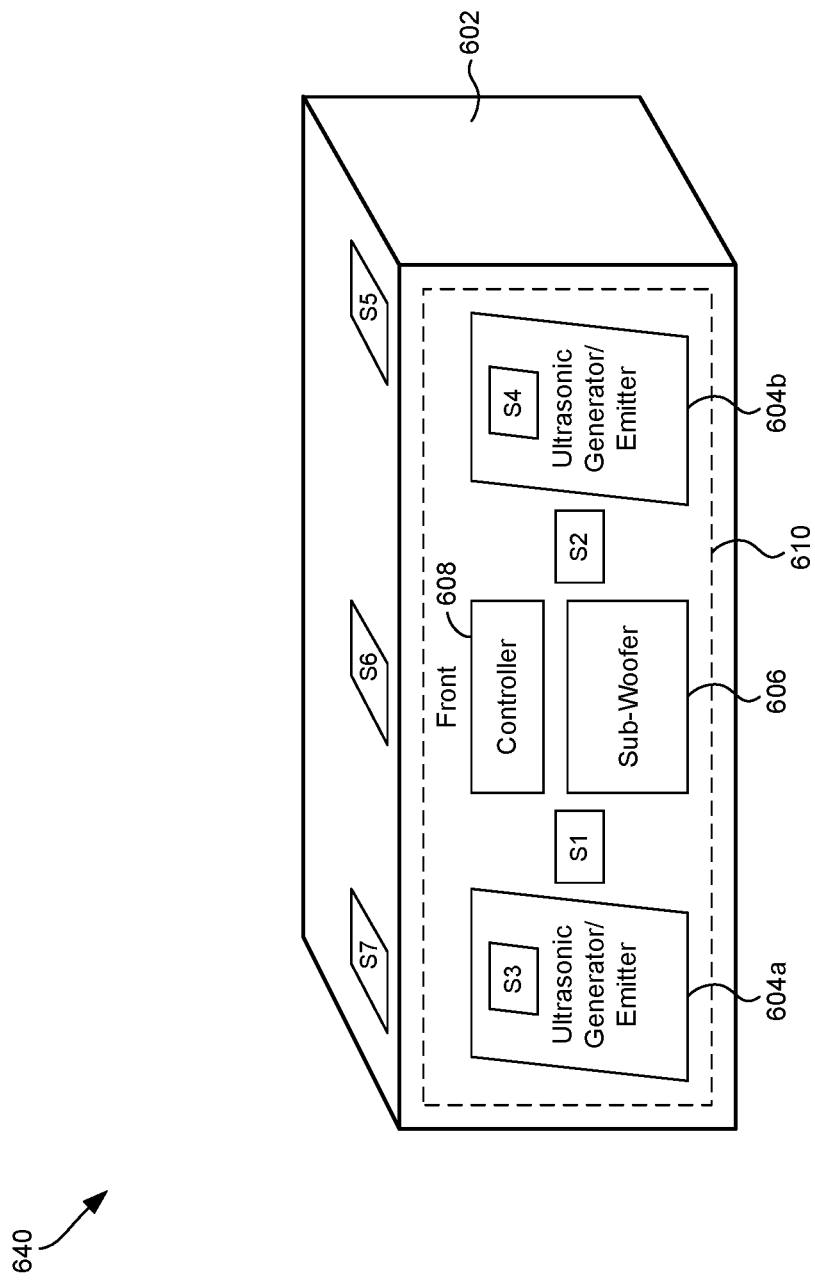
FIG. 6C illustrates an example ultrasonic emitter system floor audio unit comprising integrated sensors, in accordance with an example embodiment of the present disclosure.

FIG. 6C illustrates an example ultrasonic emitter system floor audio unit comprising integrated sensors, in accordance with an example implementation of the present disclosure. Shown in FIG. 6C is an ultrasonic emitter system floor audio unit 640.

The ultrasonic emitter system floor audio unit 640 may comprise an enclosure 602, ultrasonic generators/emitters 604a and 604b, a sub-woofer 606, a controller 608, a protective material or component 610, and a plurality of sensors S1, S2, S3, S4, S5, S6, and S7.

The ultrasonic emitter system floor audio unit 640 comprising the enclosure 602, the ultrasonic generators/emitters 604a and 604b, the sub-woofer 606, the controller 608, and the protective material or component 610 are illustrated in and described with respect to FIG. 6A, for example.

The enclosure 602 may also function as a housing that encases and protects the components of the ultrasonic emitter system floor audio unit 640. In this regard, the enclosure 602 may also serve as a support for the plurality of sensors S1, S2, S3, S4, S5, S6, and S7. In this regard, the sensors S1, S2, S3, S4, S5, S6, and S7 may be mounted on the face and/or on the top of the enclosure 602. Sensors that are mounted on the top of the enclosure 602 may be placed towards the front of the enclosure 602.

Each of the plurality of sensors S1, S2, S3, S4, S5, S6, and S7 may comprise suitable logic, circuitry, interfaces and/or code that may be operable to emit electromagnetic signals and/or sonic signals that may be utilized to determine the height of the listener. In this regard, the sensors S1, S2, S3, S4, S5, S6, and S7 may comprise transducers that may be utilized to determine the height of the listener. Based on the height of the listener, the ultrasonic generators/emitters 604a and 604b may be angled or tilted so that they may direct and project the 3D hypersound audio towards the ear of the listener. In this regard, the listener 624 may optimally listen to the upwardly projecting 3D hypersound audio that is generated from the ultrasonic generators/emitters 604a and 604b.

The controller 608 may comprise suitable logic, circuitry, interfaces and/or code that may be operable to control operation of the sensors S1, S2, S3, S4, S5, S6, and S7. In this regard, the controller 608 may be operable to configure the sensors to transmit and/or receive signals that may be utilized to determine the height of the listener. The controller 608 may determine the height of the listener based on, for example, changes in frequency (Doppler), and/or phase of the transmitted and received signals. The controller 608 may be operable to control the one or more motorized mounts in the enclosure 602 in order to optimally adjust the angle of the ultrasonic generators/emitters 604a and 604b so that they may direct and project the 3D hypersound audio towards the head and ears of the listener based on the determined height of the listener.

In accordance with an example implementation, one or more the sensors S1, S2, S3, S4, S5, S6, and S7 may comprise a directional microphone that may be utilized to capture audio from the listener. In an example implementation, pre-recorded audio instructions may be played requesting the listener to utter a random or predefined phrase or sound. The controller 608 may adjust and/or process the corresponding sound that is received from the listener. Based on the processing, the controller 608 may determine the location of the mouth of the listener. Alternatively (or additionally), the audio requested from the listener might be an indication or utterance of the listener's height. In any event, the controller 608 may be operable to control the one or more motorized mounts in the enclosure 602 in order to optimally adjust the angle of the ultrasonic generators/emitters 604a and 604b so that they may direct and project the 3D hypersound audio towards the ears of the listener based on the determined location of the mouth of the listener or based on the height of the individual. The ultrasonic generators/emitters 604a and 604b may then project 3D hypersound audio from the floor up towards the head of the listener.

Figure 6D:
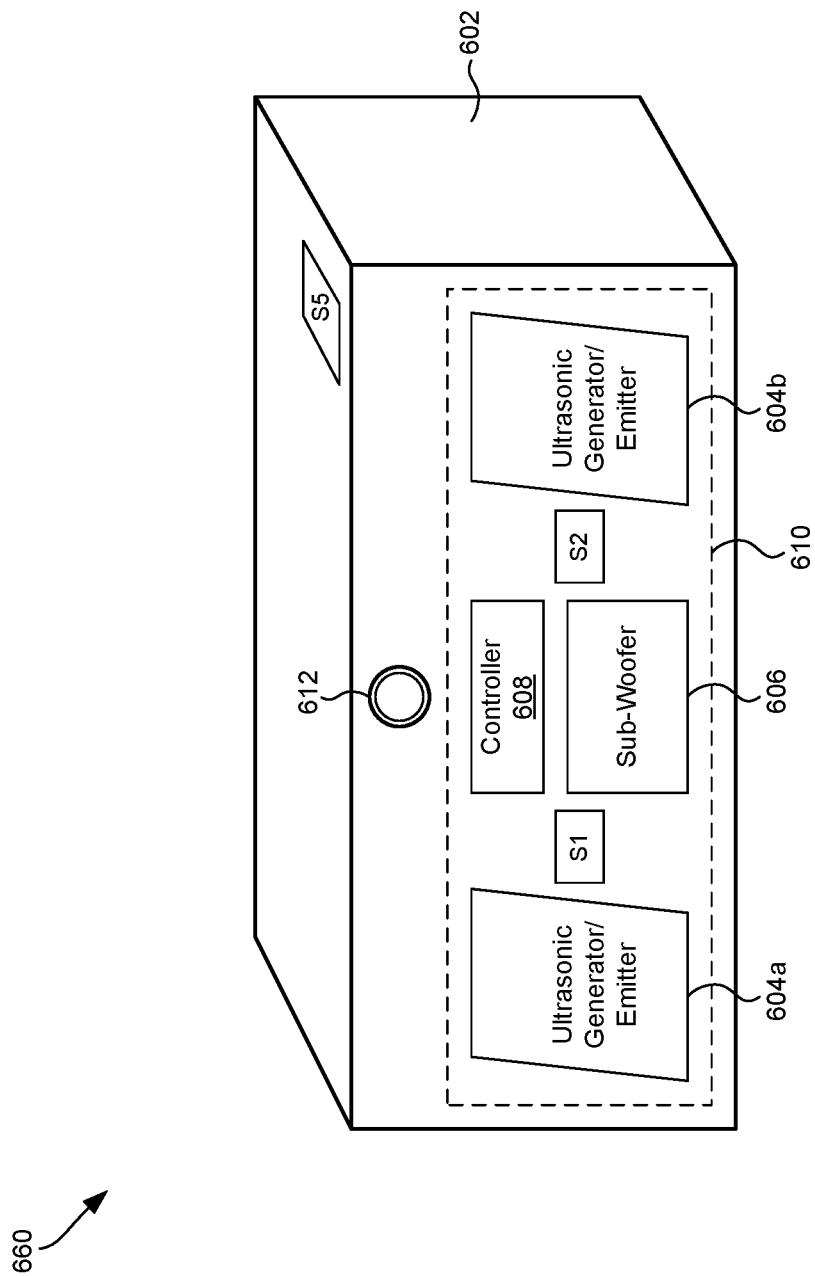
FIG. 6D illustrates an example ultrasonic emitter system floor audio unit comprising an integrated camera, in accordance with an example embodiment of the present disclosure.

FIG. 6D illustrates an example ultrasonic emitter system floor audio unit comprising an integrated camera, in accordance with an example implementation of the present disclosure. Shown to FIG. 6D is an ultrasonic emitter system floor audio unit 660.

The ultrasonic emitter system floor audio unit 660 may comprise an enclosure 602, ultrasonic generators/emitters 604a and 604b, a sub-woofer 606, a controller 608, a protective material or component 610, and an integrated camera 612. The ultrasonic emitter system floor audio unit 660 may comprise the sensors S1, S2, S5, which may or may not be optional components. In an example implementation, one of the sensors S1, S2, S5 may comprise a proximity sensor and another may comprise a microphone.

The ultrasonic emitter system floor audio unit 660 comprising the enclosure 602, the ultrasonic generators/emitters 604a and 604b, the sub-woofer 606, the controller 608, and the protective material or component 610 are illustrated in and described with respect to FIG. 6A, for example. The sensors S1, S2, S5 are illustrated in and described with respect to FIG. 6C, for example.

The enclosure 602 may also function as a housing that encases and protects the components of the ultrasonic emitter system floor audio unit 660. In this regard, the enclosure 602 may also comprise an integrated camera 612. The integrated camera 612 may be mounted on the face or top of the enclosure 602 where it may be able to capture and detect the face or head of the listener.

In an example implementation, the sensors S1, S5 may comprise proximity sensors and the sensor S2 may comprise a microphone. The proximity sensors S1, S5 may each comprise a transducer that may be utilized to determine the height of the listener. Based on the height of the listener, the angle of ultrasonic generators/emitters 604a and 604b may be adjusted so that they may direct and project the 3D hypersound audio up towards the ears of the listener.

The integrated camera 612 may be operable to capture an image of the listener and utilize a face recognition algorithm to determine a location of the head of the listener. Information identifying the location of the head of the listener may be communicated to the controller 608.

The controller 608 may comprise suitable logic, circuitry, interfaces and/or code that may be operable to control operation of the sensors S1, S2, S5, and the integrated camera 612. In this regard, the controller 608 may be operable to acquire and process data from the proximity sensors S1, S5 in order to determine the height of the listener. The controller 608 may also be operable to receive and process the information from the integrated camera 612, which identifies the location of the head of the listener. The controller 608 may be operable to combine the information identifying the height of the listener with the information identifying the location of the head of the listener to get a more accurate location of the head of the listener. The controller 608 may be operable to control the one or more motorized mounts in the enclosure 602 in order to optimally adjust the angle of the ultrasonic generators/emitters 604a and 604b so that they may direct and project the 3D hypersound audio towards the ear of the listener based on the combined information identifying the height of the listener and the information identifying the location of the head of the listener. The ultrasonic generators/emitters 604a and 604b may then project 3D hypersound audio from the floor up towards the head of the listener.

In some example implementations, the controller 608 may be operable to control the one or more motorized mounts in the enclosure 602 in order to optimally adjust the angle of the ultrasonic generators/emitters 604a and 604b so that they may direct and project the 3D hypersound audio towards the ears of the listener based on the information from the integrated camera identifying the head and ears of the listener. The ultrasonic generators/emitters 604a and 604b may then project 3D hypersound audio from the floor up towards the head and ears of the listener.

Figure 7:
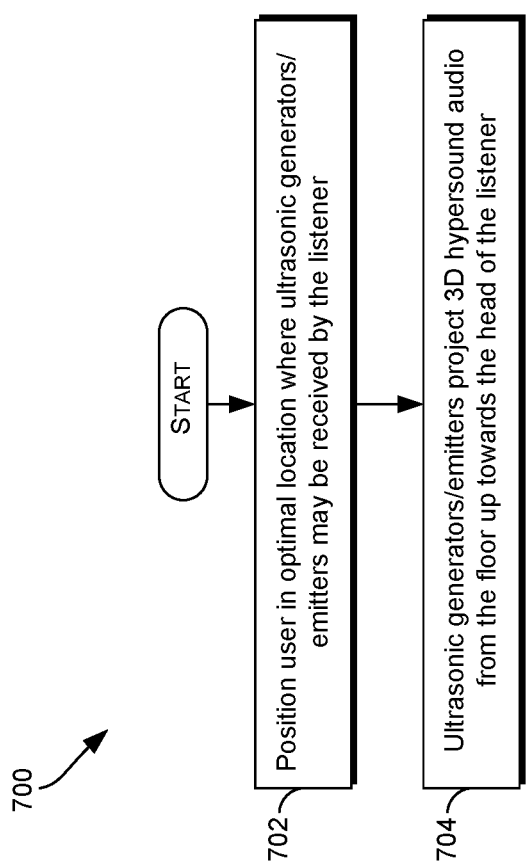
FIG. 7 is a flow chart illustrating an example process for generating hypersound audio from an ultrasonic emitter system floor audio unit, in accordance with various example embodiments of the present disclosure.

FIG. 7 is a flow chart illustrating an example process for generating hypersound audio from an ultrasonic emitter system floor audio unit, in accordance with various example embodiments of the present disclosure. Shown in FIG. 7 is a sequence 700 of example steps for operating an ultrasonic emitter system floor audio unit using predetermined listening position markers.

In step 702, the user is positioned in an optimal location where ultrasonic generators/emitters may be received by the listener. This may be done by use of pre-determined listening position markers (e.g., the optimal standing position marker 626).

In step 704, the ultrasonic generators/emitters project 3D hypersound audio from the floor up towards the head of the listener. This may comprise making any required adjustments (e.g., to angle of ultrasonic generators/emitters, beamforming applied, etc.) based on the pre-determined positioning markers.

Figure 8:
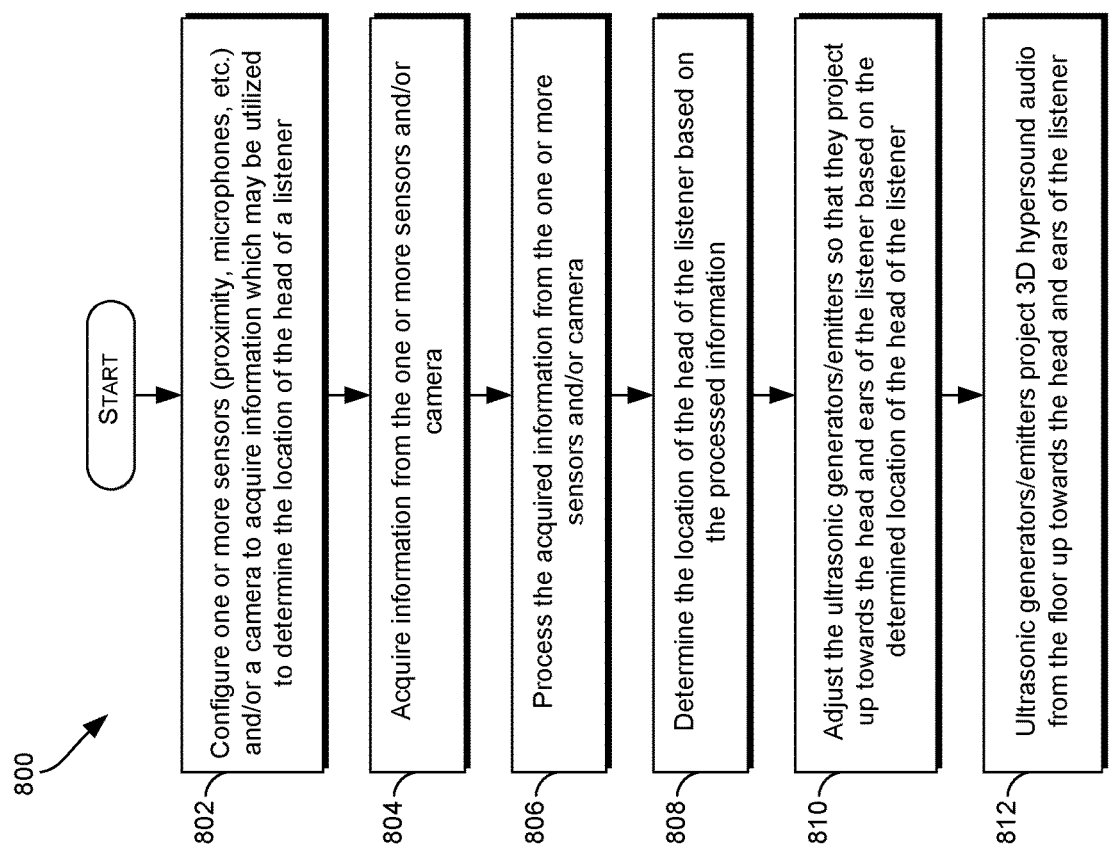
FIG. 8 is a flow chart illustrating an example process for generating hypersound audio from an ultrasonic emitter system floor audio unit, in accordance with various example embodiments of the present disclosure.

FIG. 8 is a flow chart illustrating an example process for generating hypersound audio from an ultrasonic emitter system floor audio unit, in accordance with various example embodiments of the present disclosure. Shown in FIG. 8 is sequence 800 of example steps for operating an ultrasonic emitter system floor audio unit based on determination of listeners' positions.

In step 802, one or more sensors (proximity, microphones, etc.) and/or a camera may be configured to acquire information which may be utilized to determine the location of the head of a listener.

In step 804, information may be acquired from the one or more sensors and/or camera (e.g., one or more of sensors S1, S2, S3, S4, S5, S6, and S7, and/or camera 612).

In step 806, the acquired information from the one or more sensors and/or camera may be processed (e.g., via the controller 608).

In step 808, the location of the head of the listener may be determined (e.g., via the controller 608) based on the processed information.

In step 810, the ultrasonic generators/emitters may be adjusted (e.g., by the controller 608, such as, for example, by controlling a movement mechanism or beamforming associated with the ultrasonic generators/emitters) so that they project up towards the head and ears of the listener based on the determined location of the head of the listener.

In step 812, the ultrasonic generators/emitters project 3D hypersound audio from the floor up towards the head and ears of the listener, providing optimal listening experience.

Figure 9:
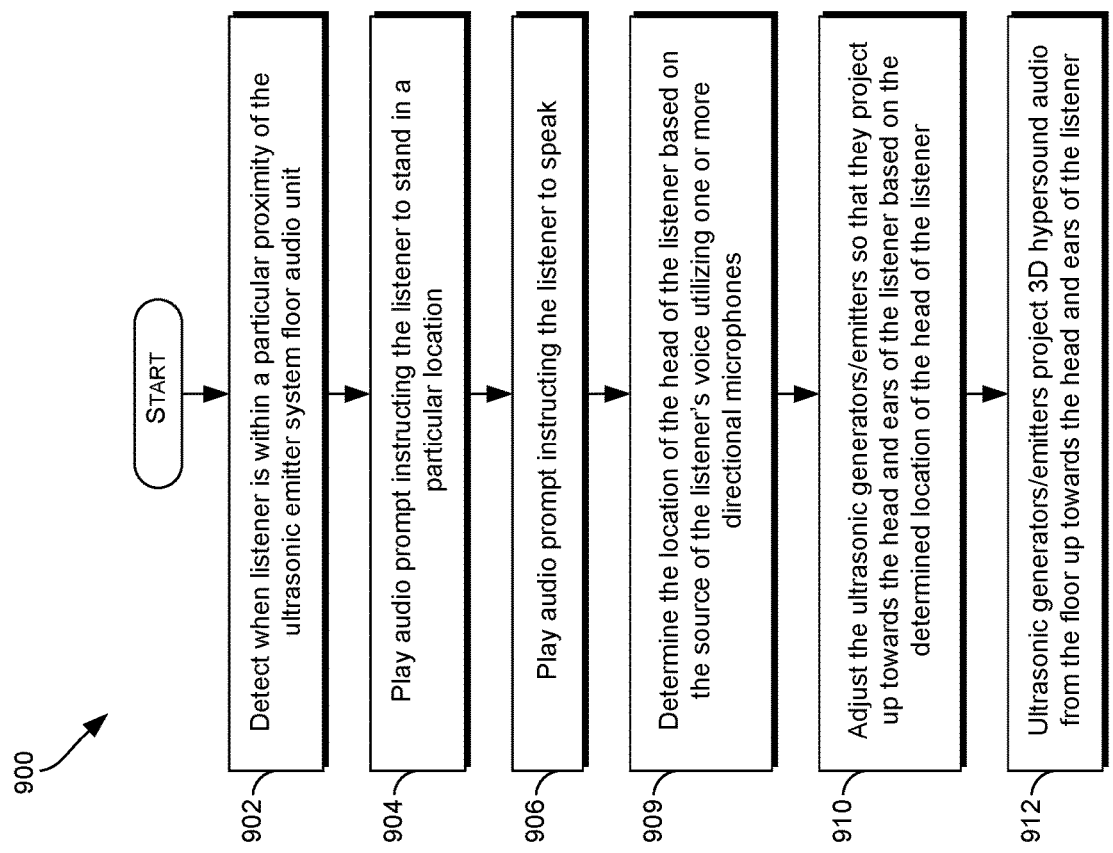
FIG. 9 is a flow chart illustrating an example process for hypersound audio from an ultrasonic emitter system floor audio unit, in accordance with various example embodiments of the present disclosure.

FIG. 9 is a flow chart illustrating an example process for hypersound audio from an ultrasonic emitter system floor audio unit, in accordance with various example embodiments of the present disclosure. Shown in FIG. 9 is a sequence 900 of example steps for example steps for operating an ultrasonic emitter system floor audio unit based on interactions with listeners.

In step 902, the listener may be detected when the listener is within a particular proximity of the ultrasonic emitter system floor audio unit may be detected. The detection may be performed using suitable sensors (proximity, microphones, etc.), cameras, etc., which may be configured to detect listeners when in particular proximity of the ultrasonic emitter system floor audio unit.

In step 904, an audio prompt may be generated and/or played, instructing the listener to stand in a particular location.

In step 906, an audio prompt may be generated and/or played, instructing the listener to speak.

In step 908, the location of the head of the listener may be determined (e.g., via the controller 608) based on the source of the listener's voice utilizing one or more directional microphones.

In step 910, the ultrasonic generators/emitters may be adjusted (e.g., by the controller 608, such as, for example, by controlling a movement mechanism or beamforming associated with the ultrasonic generators/emitters) so that they project up towards the head and ears of the listener based on the determined location of the head of the listener.

In step 912, the ultrasonic generators/emitters project 3D hypersound audio from the floor up towards the head and ears of the listener.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An audio device comprising:
an orientation determination circuit configured to determine an orientation of at least a part of a user's body;
a first audio output component;
a second audio output component; and
a controller configured to control the first audio output component and the second audio output component based on the determined orientation;
wherein the determined orientation corresponds to a positional nature of the user within a three-dimensional space around the user;
wherein the controller is configured to provide a three-dimensional audio environment according to the user; and
wherein the three-dimensional audio environment is aligned according to a visual input provided to the user.

2. The audio device of claim 1, wherein the controller is configured to control configuring at least one audio output related parameter or function for optimizing, based on the determined orientation, directionality of at least one of the first audio output component and the second audio output component.

3. The audio device of claim 1, wherein the controller is configured to configure at least one of the first audio output component and the second audio output component to optimize, based on the determined orientation, directionality of an audio output based on the determined orientation.

4. The audio device of claim 3, wherein the controller is configured to adjust positioning at least one of the first audio output component and the second audio output component, based on the determined orientation, to optimize the directionality of the audio output.

5. The audio device of claim 1, wherein the controller is configured to control the outputting of audio output from at least one of the first audio output component and the second audio output component to create a particular audio experience by the user.

6. The audio device of claim 1, comprising one or more sensors configured to generate sensory data relating to the user; and wherein the orientation determination circuit is configured to generate or adjust the determined orientation based on the sensory data.

7. The audio device of claim 6, wherein the one or more sensors comprise one or more of proximity sensors, audio input devices, and visual input devices.

8. The audio device of claim 1, further comprising an audio input component; and wherein the orientation determination circuit is configured to generate or adjust the determined orientation based on an audio input received via the audio input component.

9. The audio device of claim 8, wherein the audio input component comprises a directional microphone.

10. The audio device of claim 8, wherein the controller is configured to:
instruct the user to adjust a user's position in relation to at least one of the first audio output component and the second audio output component; and
in response to detecting an adjustment of the user's position, prompt the user to provide the audio input.

11. A method for controlling an audio device that comprises a first audio output component and a second audio output component, the method comprising:
determining an orientation of at least a part of a user's body; and
controlling the first audio output component and the second audio output component based on the determined orientation;
wherein the determined orientation corresponds to a positional nature of the user within a three-dimensional space around the user;
wherein the controlling comprises providing a three-dimensional audio environment according to the user; and
wherein the three-dimensional audio environment is aligned according to a visual input provided to the user.

12. The method of claim 11, further comprising configuring at least one audio output related parameter or function for optimizing, based on the determined orientation, directionality of at least one of the first audio output component and the second audio output component.

13. The method of claim 11, further comprising configuring at least one of the first audio output component and the second audio output component to optimize, based on the determined orientation, directionality of an audio output based on the determined orientation.

14. The method of claim 13, wherein the controller is configured to adjust positioning at least one of the first audio output component and the second audio output component, based on the determined orientation, to optimize the directionality of the audio output.

15. The method of claim 11, further comprising controlling the outputting of audio output from at least one of the first audio output component and the second audio output component to create a particular audio experience by the user.

16. The method of claim 11, further comprising:
generating sensory data relating to the user; and
generating or adjusting the determined orientation based on the sensory data.

17. The method of claim 11, further comprising generating or adjusting the determined orientation based on an audio input.

18. The method of claim 17, further comprising:
instructing the user to adjust a user's position in relation to at least one of the first audio output component and the second audio output component; and
in response to detecting an adjustment of the user's position, prompting the user to provide the audio input.

* * * * *